(12) United States Patent
Vänskä

(10) Patent No.: US 6,789,081 B1
(45) Date of Patent: *Sep. 7, 2004

(54) INFORMATION MANAGEMENT TECHNIQUE

(75) Inventor: Marko Vänskä, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,036

(22) Filed: May 12, 2000

Related U.S. Application Data

(63) Continuation-in-part of application No. 09/494,471, filed on Jan. 31, 2000.

(51) Int. Cl.[7] .......................... G06F 17/30; G06F 13/00
(52) U.S. Cl. .......................... 707/100; 707/102; 725/46
(58) Field of Search ............................. 707/1–5, 9–10, 707/100, 205; 709/201, 207

(56) References Cited

U.S. PATENT DOCUMENTS 5,802,518 A * 9/1998 Karaev et al. .................. 707/9

FOREIGN PATENT DOCUMENTS

| EP | 0 848 338 A1 | 6/1998 |
|---|---|---|
| WO | WO 99/33293 | 7/1999 |
| WO | WO 01/57726 A2 | 8/2001 |

* cited by examiner

*Primary Examiner*—Alford Kindred
(74) *Attorney, Agent, or Firm*—Antonelli, Terry, Stout & Kraus, LLP

(57) ABSTRACT

An information management technique includes gathering and storing data from a plurality of sources of data. The gathered and stored data is then filtered and prioritized. The filtered and prioritized data is then packaged and delivered to an end user. The data is filtered and prioritized in a plurality of layers arranged sequentially, a first layer having a broadest categorization of data and each subsequent lower layer having a narrower categorization of data than its adjacent higher layer. The plurality of data sources may include external sources of data such as sources of data accessible on the Internet and internal sources of data such as sources of data accessible on a corporate Intranet. When the data is prioritized as a "high" priority, then the data may be immediately delivered to the end user while if the data is prioritized as a "low" priority, a signal may be sent to the end user and the data delivered only upon a request by the end user.

27 Claims, 16 Drawing Sheets

INFORMATION MANAGEMENT TECHNIQUE

CROSS-REFERENCE TO RELATED APPLICATION

This application is a continuation-in-part of U.S. application Ser. No. 09/494,471, filed in the U.S. Patent and Trademark Office on Jan. 31, 2000.

BACKGROUND

1. Field of the Invention

The present invention relates to an information management technique and more particularly to an information management technique for handling and prioritizing and filtering information from external and internal sources, such as, Internet and Intranet sources, and forwarding same to a user.

2. Description of the Related Art

The use of the Internet and Intranet for the sharing and forwarding of information has increased tremendously over the past few years. Unfortunately, it has not reached its full potential partly due to the fact that there is too much information available. That is, upon requesting information from the Internet or from an Intranet, a user is inundated with information. Much of the information is only peripherally related to the topic requested by the user and therefore superfluous. Accordingly, the user must review this large amount of information to locate the relevant information desired by the user.

European Patent Publication 1,348,884 B1, published PCT Application No. WO97/27534, and U.S. Pat. Nos. 5,369,570, and 5,544,354 each disclose attempted solutions to the problem.

For example, PCT Published Application No. WO97/27534 discloses a system for navigating an information service which allows a user to navigate an on-line information system using a plurality of different screens. While simplifying the search of a user for relevant information, it nevertheless requires the user to review multiple screens and sub-screens to find the desired information.

Similarly, European Patent Publication No. 0,348,884 B1 creates navigators adjacent a main image on a screen to allow a user to navigate through the maze of information via these navigators to reduce the amount of searching needed to locate the desired information.

U.S. Pat. No. 5,369,570 discloses a method for continuous real-time management of heterogeneous interdependent resources. Multiple distributed resource engines are used to maintain timely and precise schedules and action controls, identifying and responding to rapidly changing conditions in accordance with predetermined requirements, relationships and constraints.

U.S. Pat. No. 5,544,354 discloses a user interface which provides for accessing a large database of information using both browsing and search behaviors. As with the above-noted PCT published application, it is necessary for the viewer to navigate through multiple screens to find the desired information.

SUMMARY OF THE INVENTION

The object of the present invention is to provide an information management technique which includes gathering and storing data from a plurality of sources and filtering and prioritizing the gathered and stored data. The filtered and prioritized data is then packaged and delivered to an end user. The data is filtered and prioritized in a plurality of layers arranged sequentially, a first layer having a broadest categorization of data and each subsequent lower layer having a narrower categorization of data than its adjacent higher layer.

BRIEF DESCRIPTION OF THE DRAWINGS

The foregoing and a better understanding of the present invention will become apparent from the following detailed description of example embodiments in claims when read in connection with the accompanying drawings, all forming a part of the disclosure of this invention. While the foregoing and following written and illustrated disclosure focuses on disclosing example embodiments of the invention, it should be clearly understood the same is by way of illustration and example only and the invention is not limited thereto. The spirit and scope of the present invention are limited only by the terms of the appended claims.

The following represents brief descriptions of the drawings, wherein.

DESCRIPTION OF THE INVENTION

Figure 1:
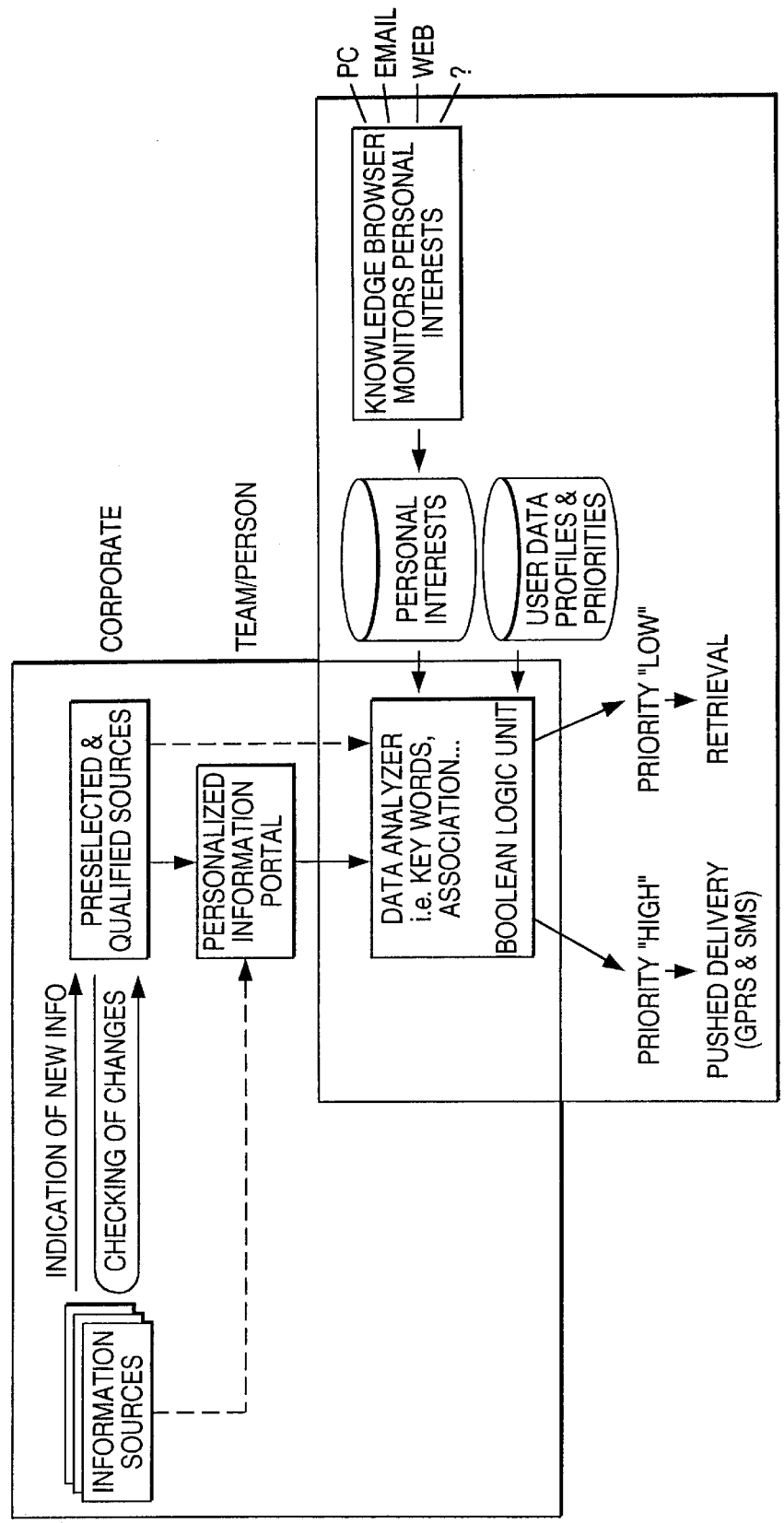
FIG. 1 illustrates the handling and prioritizing of new information in accordance with an example embodiment of the present invention.
Figure 2:
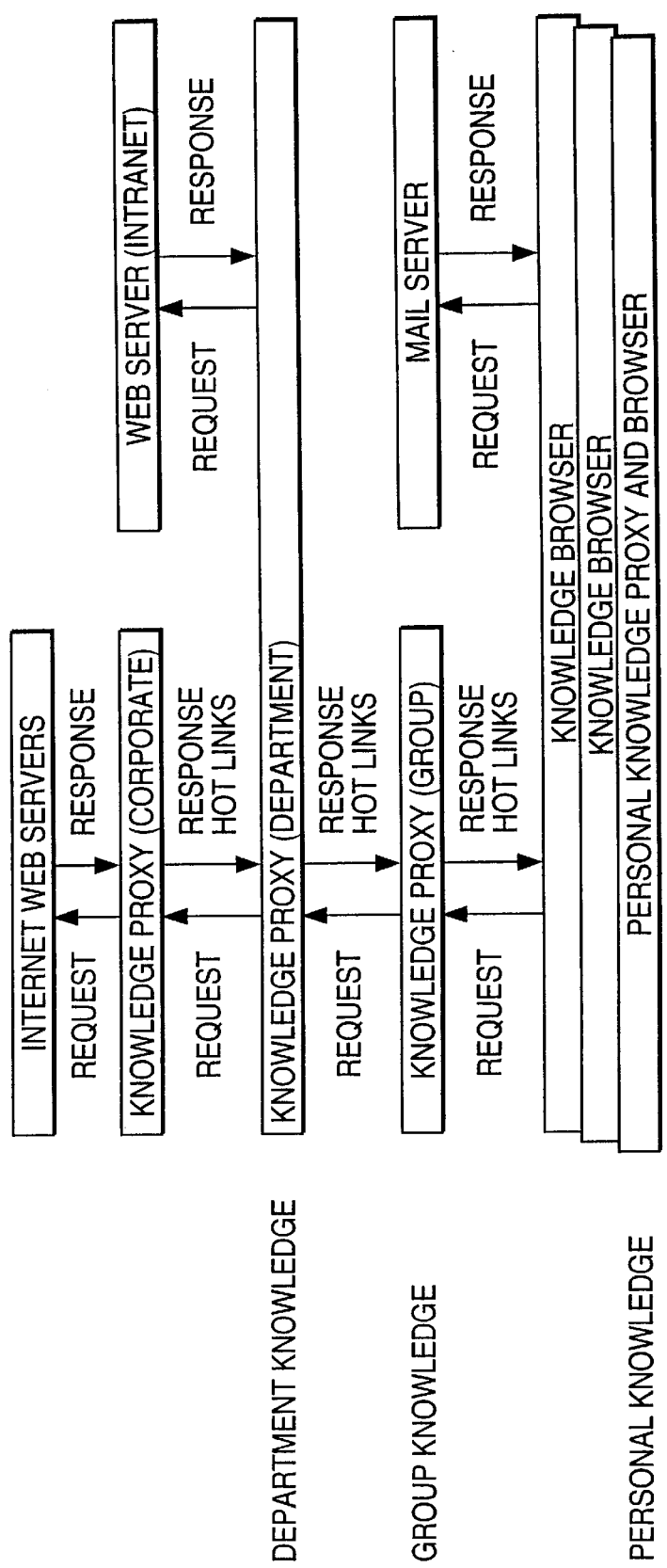
FIG. 2 illustrates the system's ladders going from top to bottom.
Figure 3:
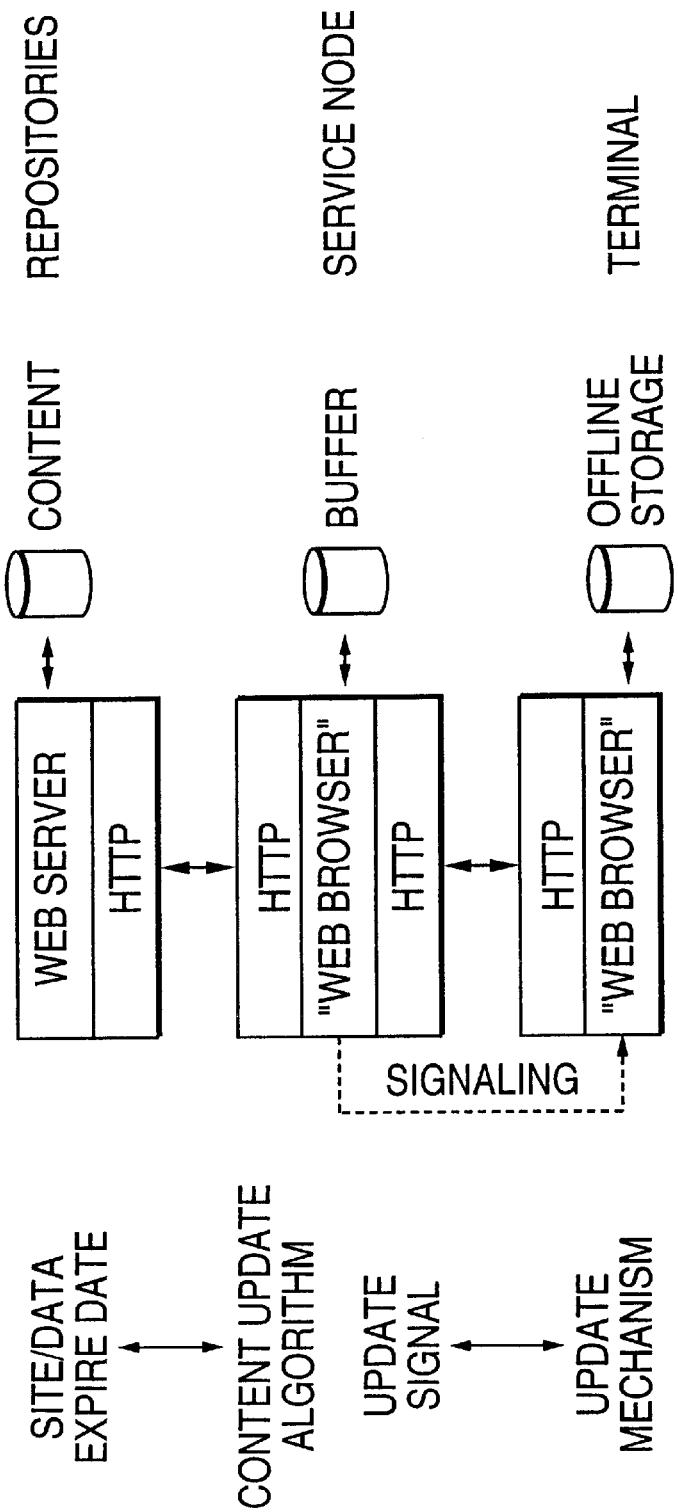
FIG. 3 illustrates the flow of information during an information update.
Figure 4:
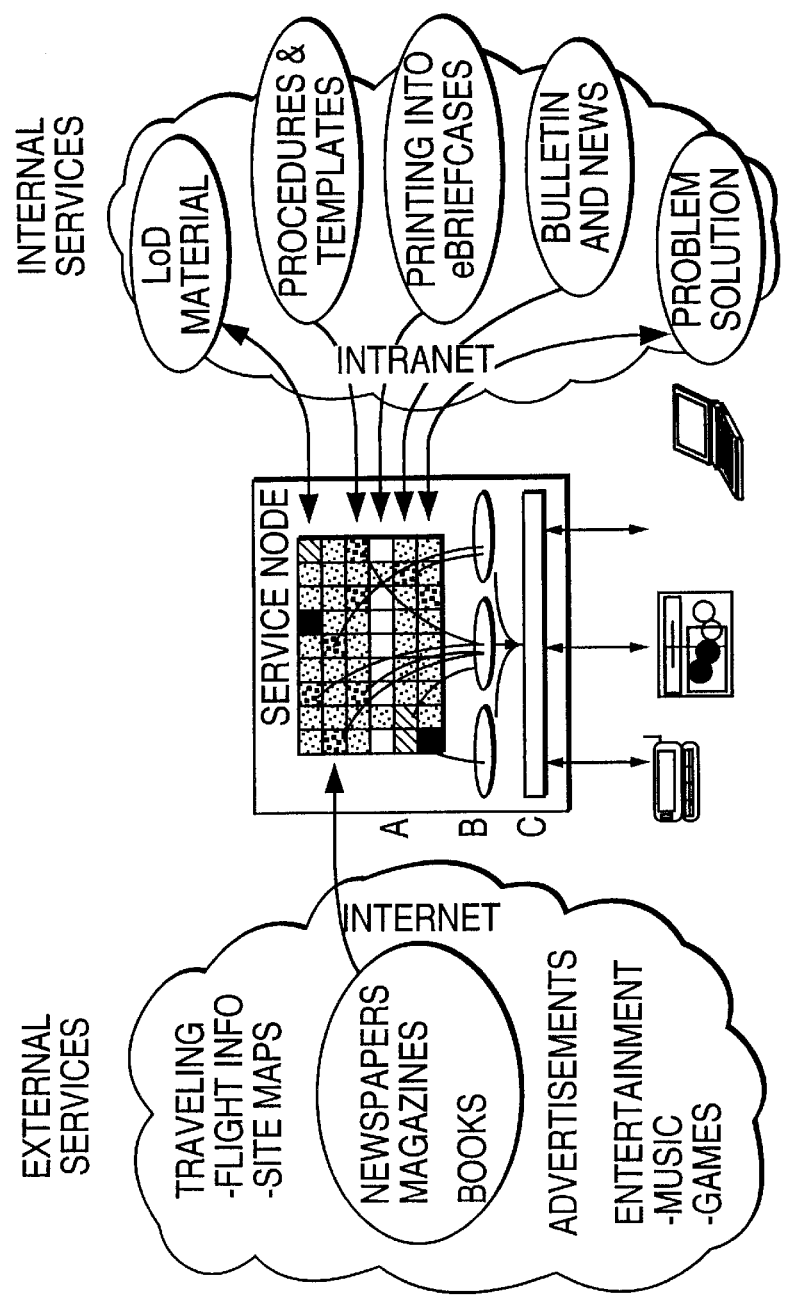
FIG. 4 illustrates the flow of information between internal and external sources and the user via a service node.

FIG. 1 illustrates the handling and prioritizing of new information in accordance with an example of the present invention and FIG. 2 illustrates the system ladders from top to bottom and FIG. 3 illustrates the flow of information during an information update. FIG. 4 illustrates the flow of information of FIGS. 1–3 between the internal and external sources and the user via the service node.

Referring to FIGS. 1–4, the present invention gathers and stores information and knowledge from different predefined sources plus additional sources via association. The information and knowledge data is filtered and prioritized based on predefined personal selections and interest areas of a user. The data is logically presented and delivered to the end user with different priorities to different kinds of terminals.

Initially, a user profile is entered into the system. This information is stored in the user data profiles and priority storage area illustrated in FIG. 1. In addition, a knowledge browser monitors the personal interests of the individual user and stores the personal interests in the personal interest storage area illustrated in FIG. 1.

As illustrated in FIG. 2, there are various layers of filtering depending on the number of users for each layer. That is, at the lowest level, the knowledge browser or personal knowledge proxy and browser filters and categorizes the information to the greatest extent for a single user.

The group knowledge layer is for a group of end users and the categorization is broader than that of the personal knowledge layer. In a similar fashion, the department knowledge layer for a department which consists of a number of groups categorizes in still a broader fashion than that of the group knowledge layer and the corporate knowledge layer for a corporate entity which consists of a number of departments is even broader still in categorization.

The categorization layer scheme of FIG. 2 serves to simplify and reduce the amount of data to be categorized and filtered and transferred by narrowing the categorization scope at each level so as to minimize the amount of data that an end user must sort through.

The corporate layer server has all of the available and preselected qualifiers in it. The corporate server also has the function to check from the outside information sources whether there are changes in old information source or additional new added information sources.

The group and department layer servers divide the information into small categorized segments of information, based on the priorities and interests of the end users of the group/department.

In the personal layer, the knowledge browser monitors and collects the interests of the end user. The end user data profiles on priorities are filtered so that a specific data analyzer can make decisions based on key words, association, subscription, etc. to offer the end user the available information.

With user data profiles on priorities, the association mechanism knows what a user wants to know and actively searches for data with the help of the server agents through the information stream of personal data sources, department data sources, group data sources, and corporation data sources.

The delivery mechanism depends on the priority of the data. If the priority is set to "high" the material is pushed to the end user terminal with a notice. On the other hand, if the priority is set to "low", the material is collected and forwarded to the personal server and stored in a buffer but is not actively sent to the user.

The delivery to the user may include one or more of the following:

A. Selecting a newspaper delivery with priority status;
B. a newspaper being ready for delivery;
C. a data retriever indicates new or changed information is waiting;
D. information is loaded into a buffer if someone has selected a priority status;
E. setting a flag for notification and sending a signal/alert to all subscribers;
F. a terminal receives the signal; and
G. if the data is within acceptable limits, the terminal loads the information into an offline memory.

This mechanism enables a user to always have all of the data available and up-to-date so that the user receives recently published material shortly after it has been published. Material such as newspapers, documents, magazines, books, and learning materials can be stored either in the network server storage area or can be downloaded to the offline memory of the user terminal.

As illustrated in FIG. 3, information is updated by checking for changes of predefined information category status from different repositories.

If the status of these predetermined categories have changed, the server sends a request for that particular data stream and loads that new information into a buffer. The server also sets a notification flag and sends a signal to all subscribers. The signal includes information about the size of the data stream and the estimated loading time. It also may provide options to the end users with regard to the delivery of the data stream if the size of the data is beyond a predetermined limit.

If the information category is determined to be of a "high" priority, then the service sends it immediately to the subscriber terminal. Otherwise, when the user terminal receives the signal, the user can choose to load or reject that particular data stream.

If the user terminal is not connected to the network, the information is stored in a buffer and when the user terminal is connected to the network, the server determines if there is anything to be updated and if so updates the information. The need for information updating is determined by the service node.

FIG. 4 illustrates the flow of information between internal and external sources and the user via the service node.

The service node contains elements A, B, and C. Element A is a knowledge mapping element which includes a link catalog and data buffer. Element B is an element which includes profiling, filtering, and context maps in the corporate, department, group, and personal levels while element C includes a media adapter, data formatter, and portals.

As illustrated in FIG. 4, data from external sources via the Internet and data from internal sources such as a corporate Intranet, are all fed to the service node.

In the element A, the various information data is mapped and buffered and then inputted to the element B where it is profiled and filtered on various levels and then forwarded to the various users.

External services may include external news services such as news delivery from an external Web page, either a free service or a subscription service. If a user wants news to be pushed to the end-user's terminal, the user sets the delivery priority to "high". With the priority set to "normal", news is retrieved by the user from the original URL address and only the link to the address is stored in the service node. The user can also use dynamic priority based on predefined keywords or associations. The news packaging is performed in element B of the service node.

As to a newspaper delivery, either an entire paper or just parts of that may be delivered based on a user profile. If they user wants news to be pushed to the end-user's terminal, the user sets the delivery priority to "high". If the priority is set to "normal", the newspaper is retrieved by the user from the original URL address and only the link to the address is stored in in the service node. The user can also use dynamic priority based on predefined keywords or associations.

Magazine delivery is effected in the same fashion has newspaper delivery. Similarly, a user can download or read on-line preselected books, such as reference books, in the same fashion as with newspaper delivery. The preselection of the books is also performed in element B of the service node.

Pages or a document may be directly printed into a terminal device, for example, into an ebriefcase, with an eprinter. Printing is effected on a PC using a normal printing scenario. If a WLAN connection is available, the printout is fowarded and stored directly in the terminal. If no WLAN connection is available, the printout is pushed to the terminal, that is, the printout is first buffered in the service node and when a connection exists, the printout is downloaded to the user's terminal.

The internal news service consists of news delivered from an internal WEB page. If a user wants news to be pushed to the end-user's terminal, the user sets the delivery priority to "high". On the other hand, if the delivery priority is set to "normal", then the news is retrieved from the original URL address and only a link to it is stored in the service node. News packaging is effected in element B of the service node.

The internal bulletins consist of discussion content delivery from an internal WEB bulletin page and are handled in the same fashion as the internal news service. This allows the user to participate in discussions.

The Learning on Demand (LoD) materials are learning materials which are related to technologies and processes and are accessed by a user to download or execute. Access to process learning is via a process adviser while access to technology learning is via personal profiling. Materials are retrieved only from the original source and URL addresses are stored in the service node.

The user may access and download job-related documents, such as process documents, templates, work instruction, and product documentation. Access to process documents is via a process adviser while access to product related documents is via personal profiling. Materials are retrieved only from the original source and URL addresses are stored in the service node.

Figure 5:
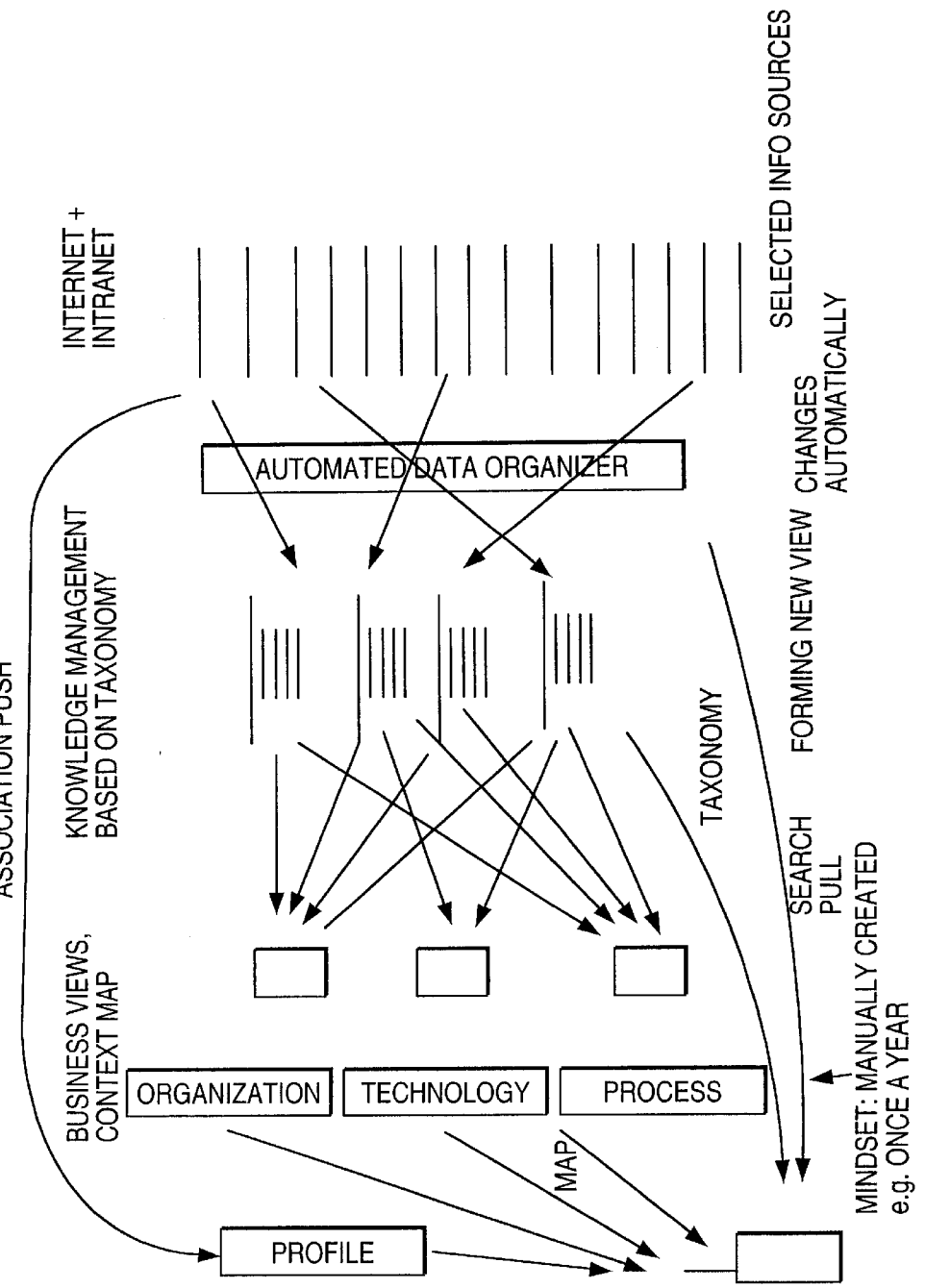
FIG. 5 illustrates the gathering and providing of information to a user terminal.

FIG. 5 illustrates the gathering and providing of information data to a user and basically illustrates the knowledge mapping of the service node of FIG. 4. That is, selected information sources from either the Internet or the corporate Intranet or other sources may reach the user via various paths.

The data from the selected information sources may be selected via association (e.g., word association) based on the profile of the user and then pushed to the user if the data is determined to be of high priority.

Alternatively, the information may pass through an automated data organizer and then sorted and subjected to knowledge management based on taxonomy (that is, classification). The information, then classified as to organization, technology, or process, for example, is then forwarded to the user based on a context map determined for the user.

Figure 6:
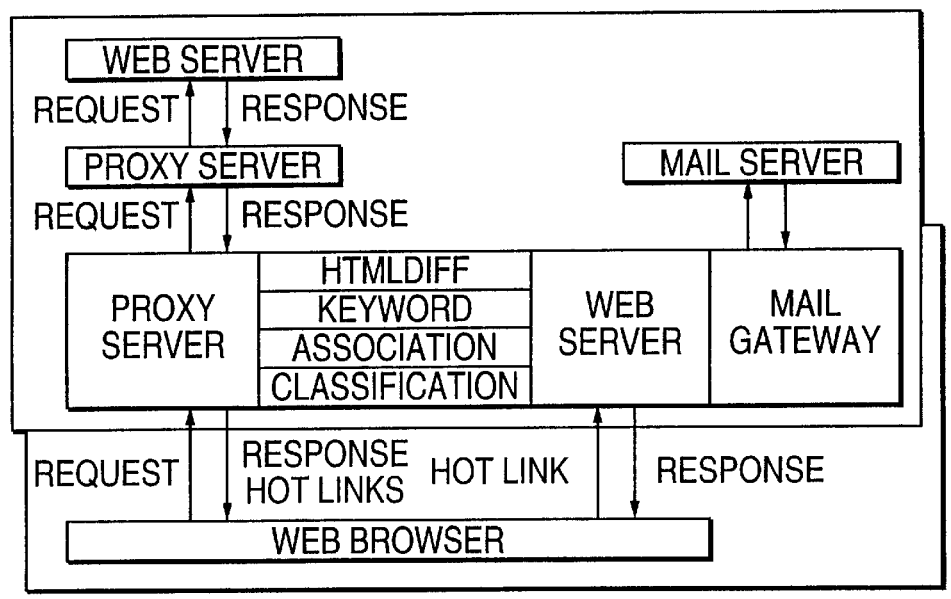
FIG. 6 illustrates the arrangement of the elements and the flow of information during associative tracing.

FIG. 6 illustrates the arrangement and the flow of information through various elements during associative tracing.

Figure 7:
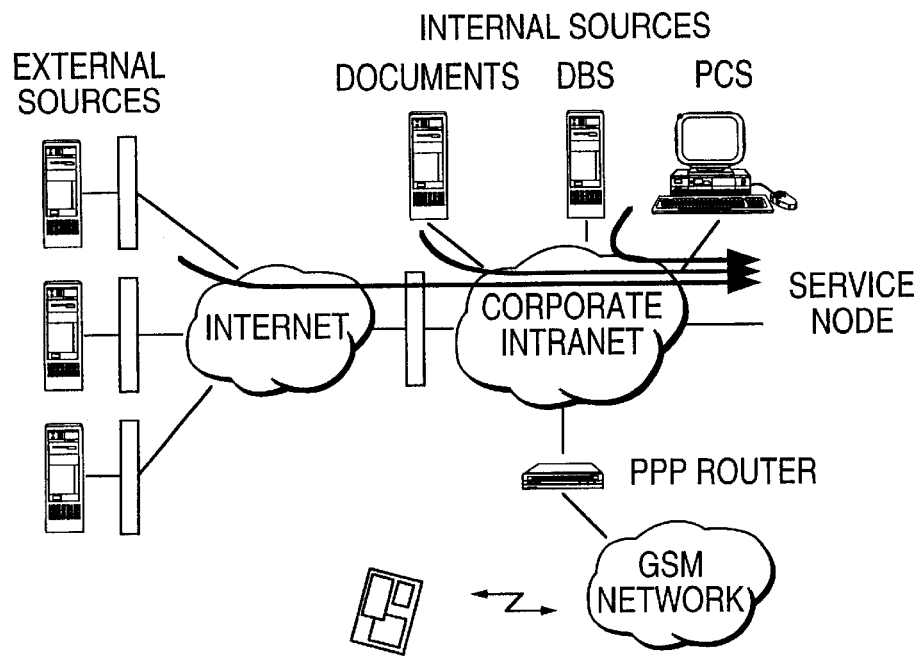
FIG. 7 illustrates the upload of pushed data from internal and external sources to a service node.

FIG. 7 illustrates the upload of pushed data from external sources via the Internet to the service node. The various external sources are connected via respective firewalls to the Internet. Normally, the data from these external sources, upon request, are forwarded through the Internet and through a corporate firewall and through a corporate intranet to the service node.

Internal sources, such as stored documents, databases, and data from individual PCs, are also inputted to the service node for classification and profiling.

Figure 8:
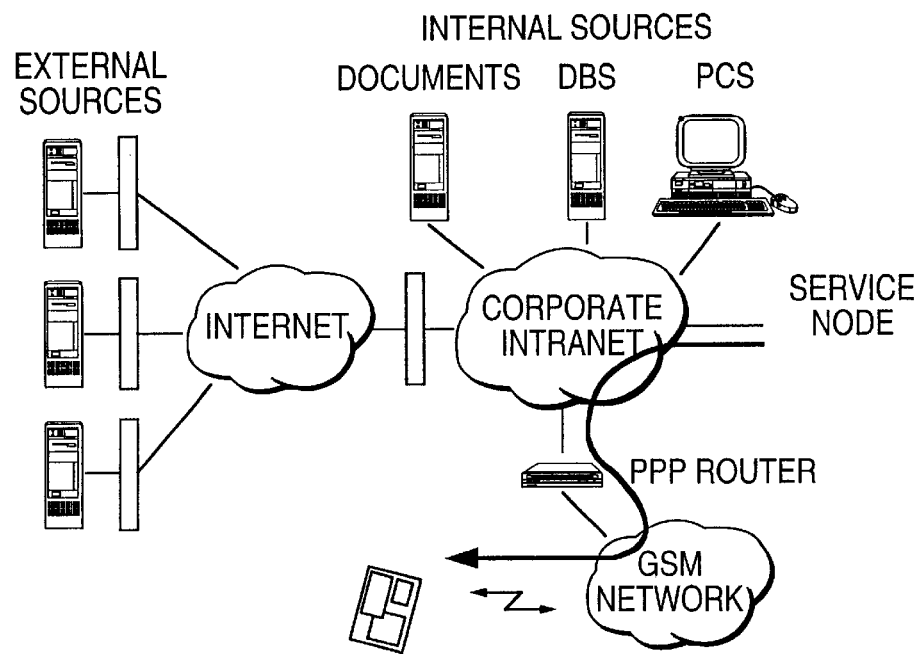
FIG. 8 illustrates the download of pushed data from a service node to a user.

As illustrated in FIG. 8, the classified and profiled data for a particular user is pushed from the service node through the corporate intranet and a PPP router and GSM network to a particular user.

Figure 9:
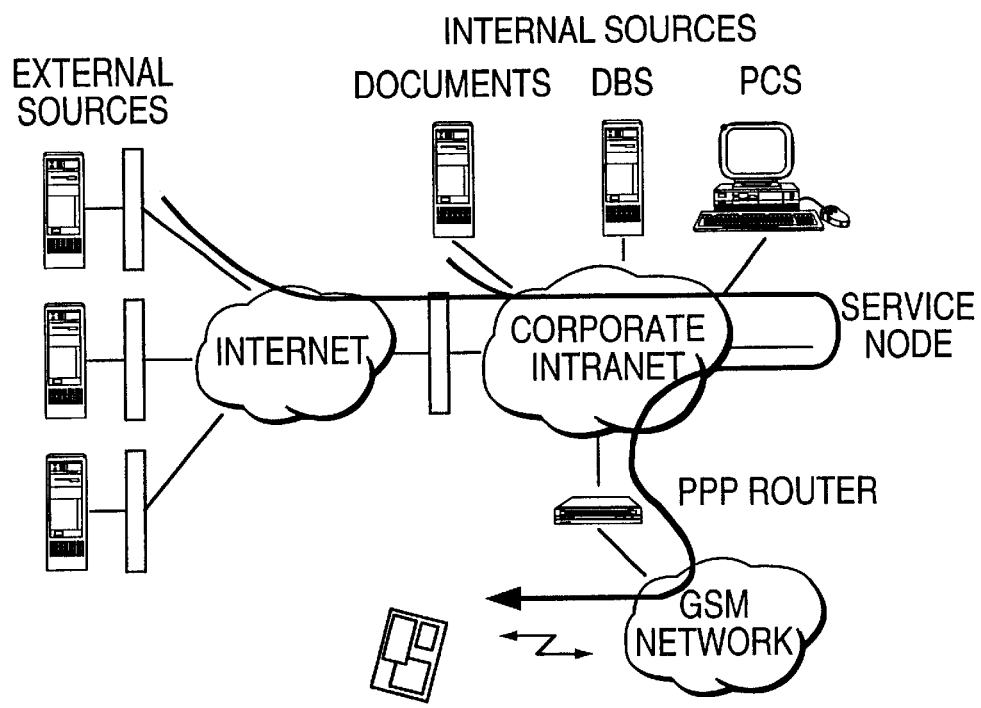
FIG. 9 illustrates data retrieval via links in a service node.

As illustrated in FIG. 9, data may be retrieved via links utilizing the service node. That is, data from an external source, upon request, is forwarded through its respective firewall and the Internet and the corporate firewall and the Intranet to the service node where it is routed back through the corporate Intranet and the PPP router and GSM network to a user requesting the data.

Figure 10:
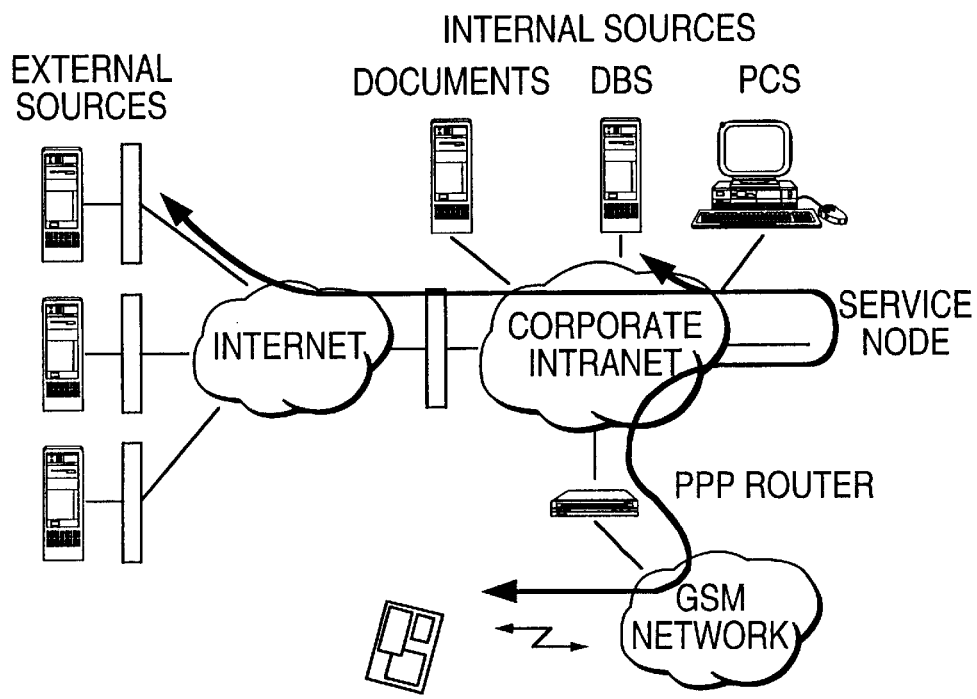
FIG. 10 illustrates the interactions of various elements with data sources.

As illustrated in FIG. 10, data contained within the service node may be forwarded through the corporate Intranet to the internal sources such as documents storage, databases, and individual PCs as well as being forwarded through the PPP router and GSM network to an individual user. Lastly, data may be forwarded through the corporate Intranet and corporate firewall and the Internet to a firewall of an external source to an external data source.

Figure 11:
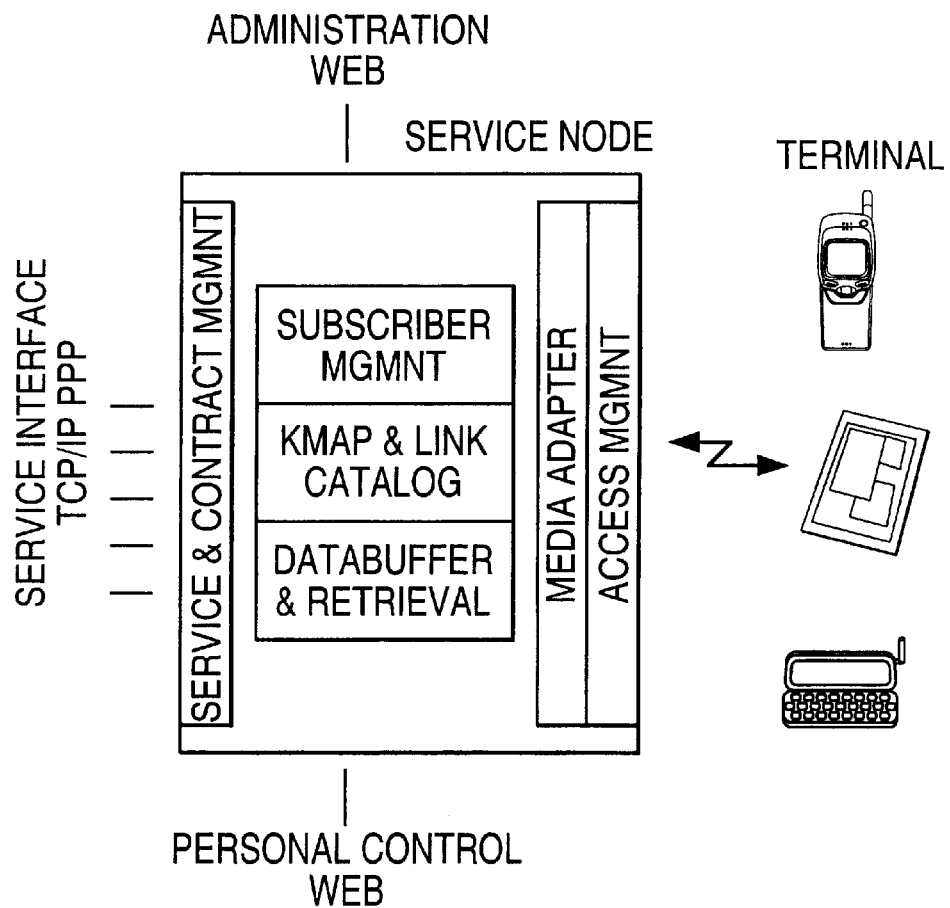
FIG. 11 illustrates a service node of an information management apparatus.

FIG. 11 illustrates a service node of an information management apparatus of the present invention. The service node includes a service and contract management portion which manages the services linked to the knowledgemap and link catalog (which is discussed below). The service and contract management portion shows how many subscribers each service has and manages contracts related to the services therein.

The subscriber management portion of the service node has a subscriber database which contains information about the users such as user profiles, user groups, ordered services, terminals, and delivery priorities per service. Service ordering is performed either by selecting services (links) from a predefined list or by just adding a new link for personal purposes.

The access management portion of the service node manages the authentication and authorization of the service node and controls the access thereto.

The knowledgemap and link catalog contains links (that is, a link catalog) to information relevant to an end-user and is organized so that finding needed information or knowledge is logical and easy. The mechanism for the knowledgemap creation could be based on knowledge browser types of applications. The knowledgemap could be described as a personalized mobile portal to knowledge. A personal knowledgemap includes links that a user has personally selected. The knowledgemap also includes default links based on employment, team interest, and corporate interest.

The data buffer and data retriever portion of the service node includes a data buffer for buffering pushed data deliveries. If a data delivery priority is set to "high", then data is retrieved from a data source and inputted to the data buffer by the data retriever. On the other hand, if the data delivery priority is set to "normal", then only a link to the data source is stored in the link catalog. The data retriever detects when there is new data in the data source or one data in the data source has changed and retrieves the data and inputs it to the data buffer. A message is sent to an end-user informing the end-user about a forthcoming data delivery, the message containing information concerning the category and size of the delivery.

The media adapter portion of the service node detects which terminal can be used for each data delivery and converts, formats, encrypts and compresses the data for the terminal.

Figure 12:
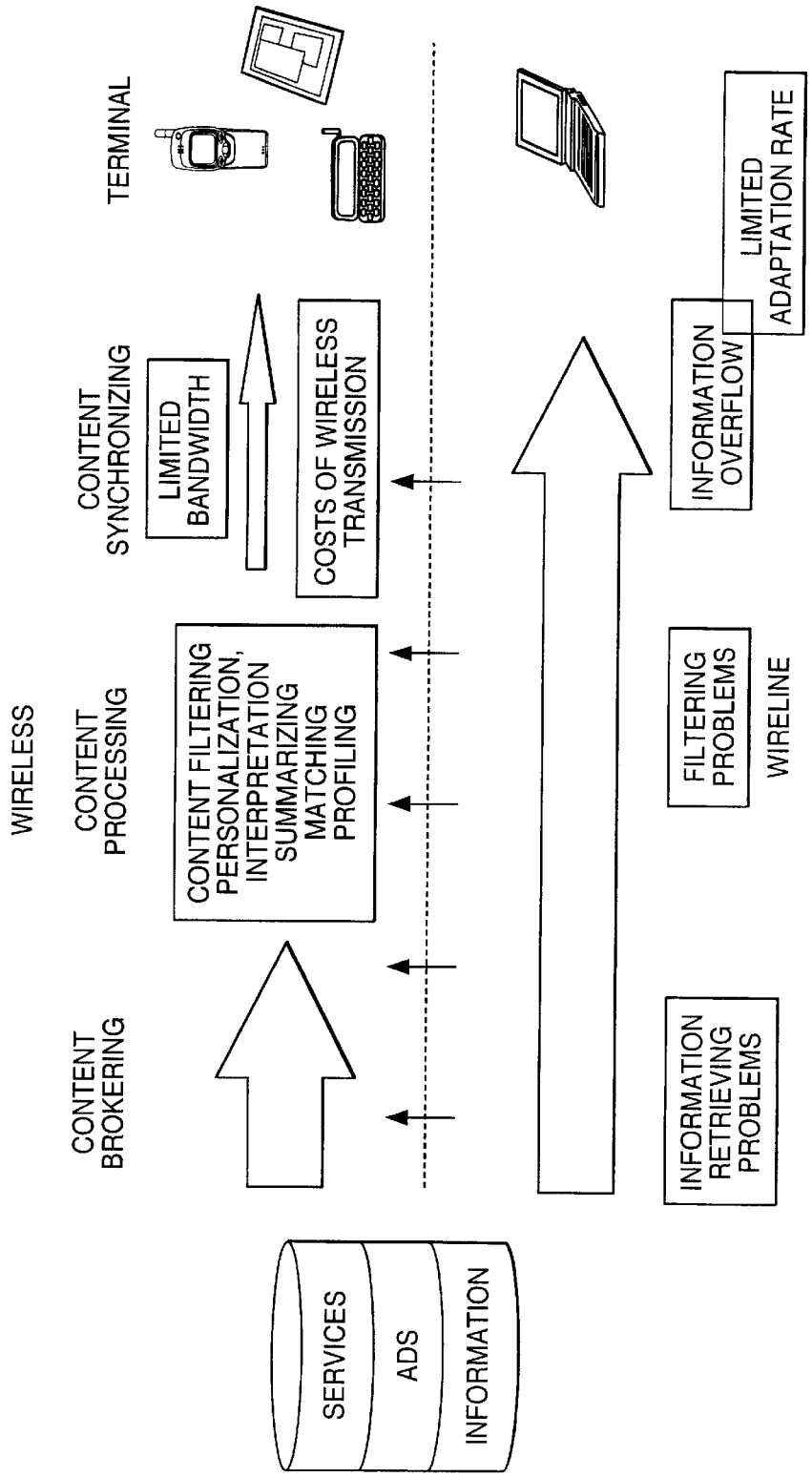
FIG. 12 illustrates a comparison of content processing between wireless and wireline information systems.

FIG. 12 is a comparison of content processing between wireless and wireline information systems. In present-day wireline systems there are problems both in information retrieval and in information filtering. This results in an information overflow which causes problems for the user. In addition, the adaptation rate is limited.

On the other hand, in wireless systems, content brokering reduces information retrieval problems. Content processing, including content filtering personalization, interpretation, summarizing, matching, and profiling all serve to significantly reduce the filtering problems present in wireline systems. In wireless systems there is also content synchronizing in view of the limited bandwidth and higher transmission costs.

Figure 13:
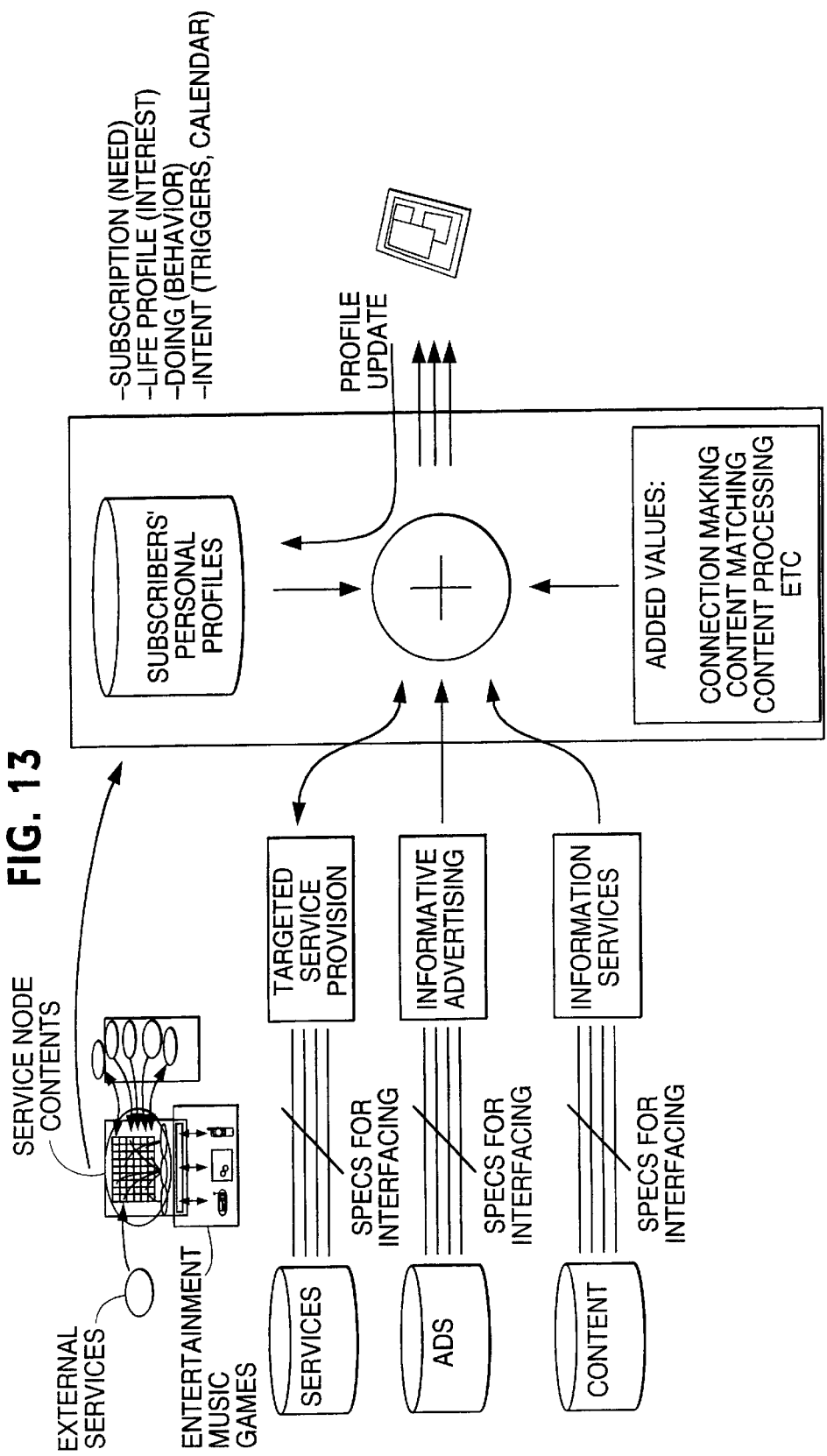
FIG. 13 illustrates content matching in accordance with the present invention.

FIG. 13 illustrates content matching in accordance with present invention. As noted in FIG. 13, ads, that is, informative advertising, is fowarded to the service node along with content, that is, information services. Services, that is, targeted service provisions, are also fowarded to the service node. Then, based on the subscribers' personal profile and the added values, the various information is fowarded to the user (subscriber). Upon receiving a profile update from the user, the user's personal profile is modified.

Figure 14:
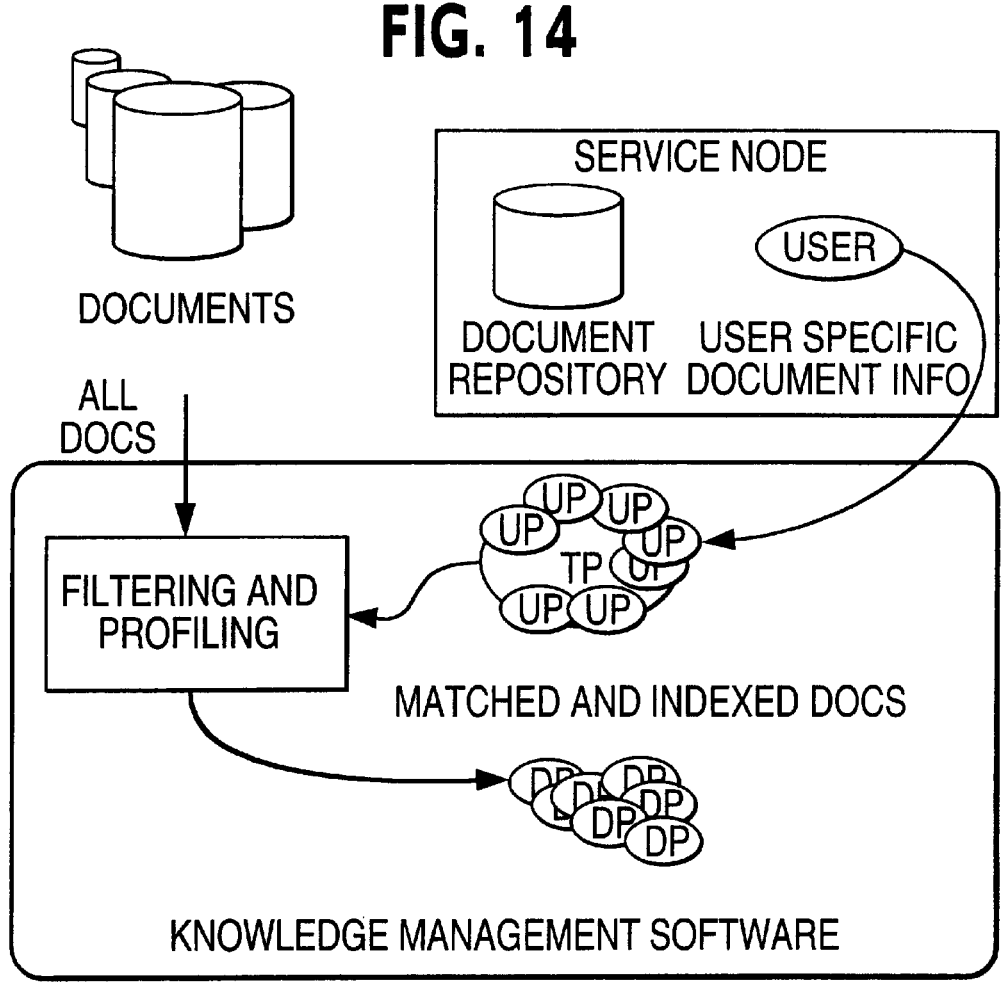
FIG. 14 illustrates scanning and indexing in accordance with the present invention.

FIG. 14 illustrates scanning and indexing in accordance with a present invention. The Knowledge Management Software (KMS) searches documents and other data and then filters and profiles them. The KMS then saves the document profiles for documents matching team or user profiles. Only a subset of all documents is used after this stage.

Figure 15:
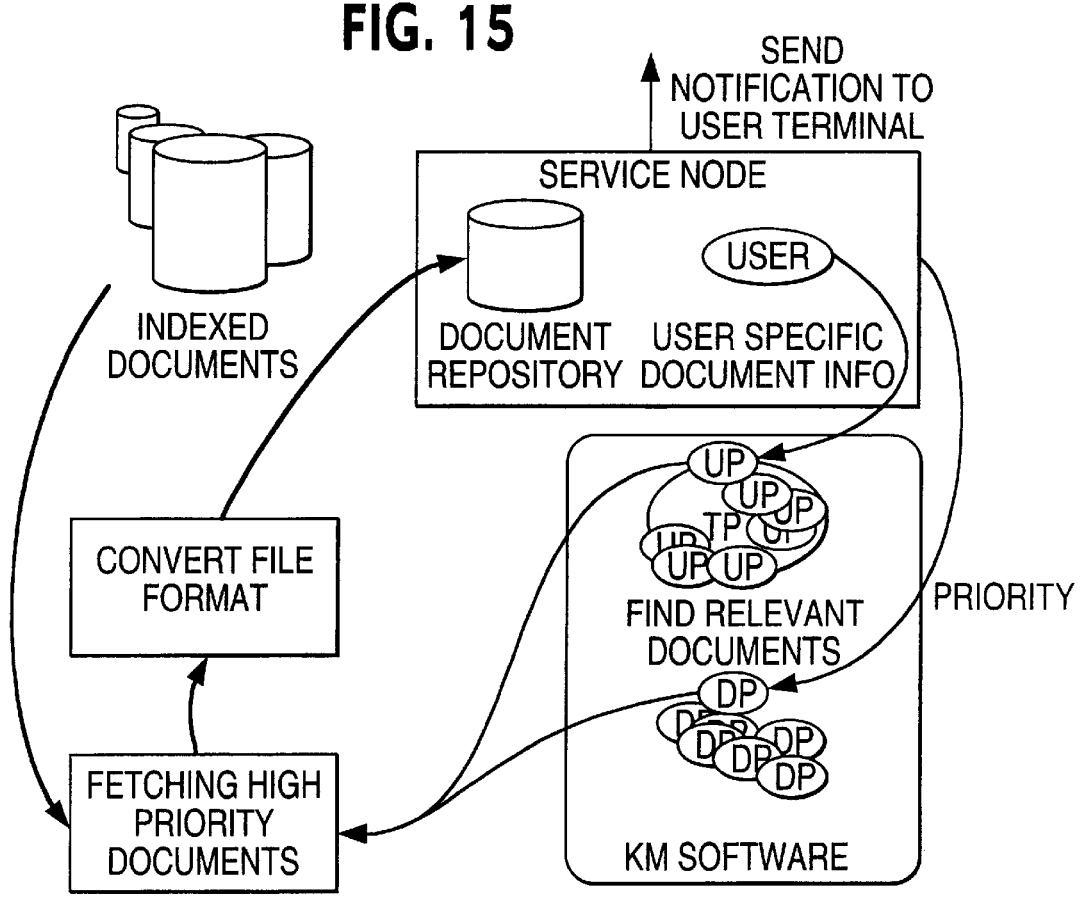
FIG. 15 illustrates document retrieval in accordance with the present invention.

FIG. 15 illustrates document retrieval in accordance with a present invention. High-priority user documents will be fetched by the service node at a personal level by selecting a certain profile, for example, a corporation profile priority can be defined. When a high-priority document is changed, a notification message is sent. The fetched documents are converted and stored in the document repository for fast and sure retrieval when the user needs them. Priority is managed by the service node and not by the KMS. Document retrieval is a continuous process handled by the scheduler. When material is created, it can be assigned to a certain profile.

Figure 16:
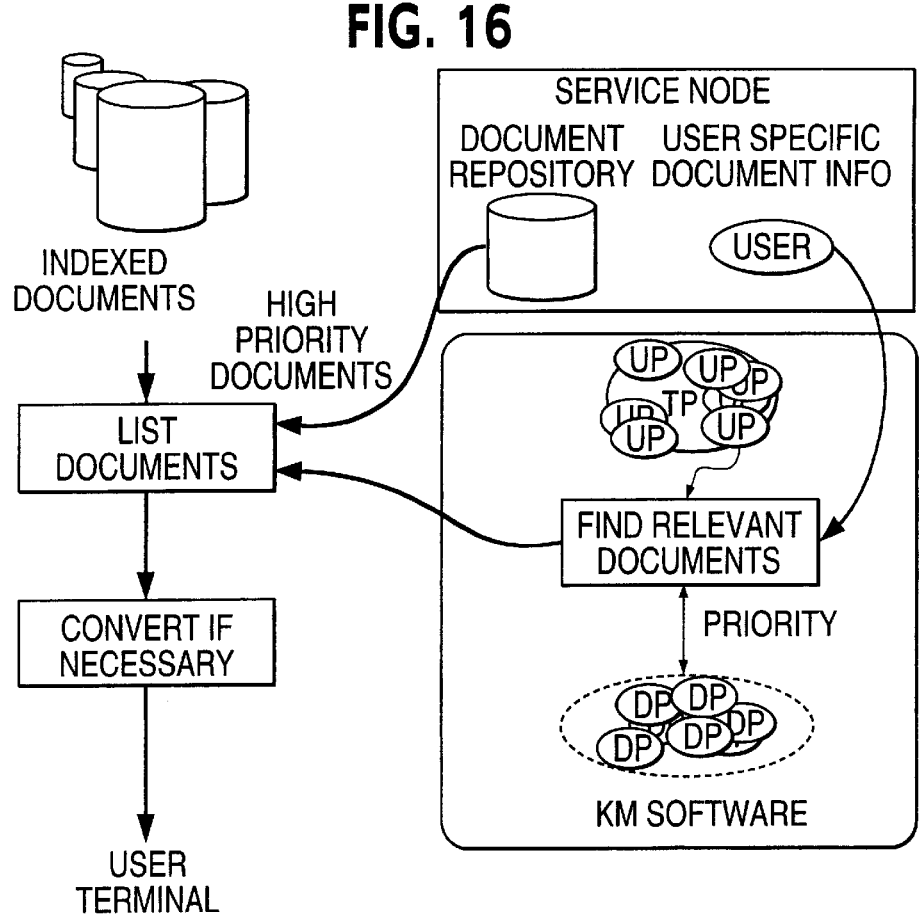
FIG. 16 illustrates document matching in accordance with present invention.

FIG. 16 illustrates document matching in accordance with present invention. A user connects to the service node and then the KMS matches the user profile to all document profiles and finds all relevant documents. A list of new first priority documents is recommended. High-priority documents are loaded into the terminal as well as a list of all relevant documents for user selection. The loaded documents will be saved in the service node regardless of their priority.

Figure 17:
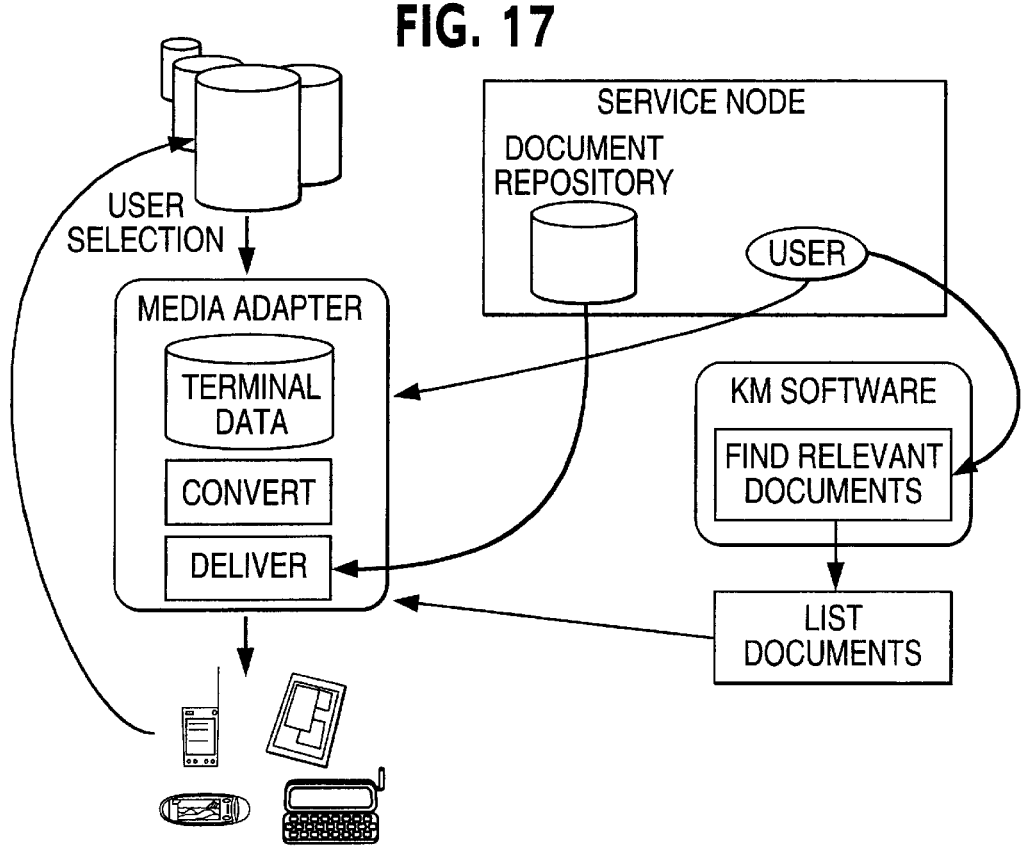
FIG. 17 illustrates the delivery of documents to a user in accordance with the present invention.

FIG. 17 illustrates delivery of documents in accordance with a present invention. A user connects to the service node and high priority documents are immediately delivered to the user upon the users' connection to the service node. Lower priority documents are delivered to the user in accordance with user selection. Thus, the user is able to view automatically loaded documents as well as a list of relevant low priority documents available for selection by the user. The lower priority documents are converted as needed whereas the high priority documents are pre-converted.

Figure 18:
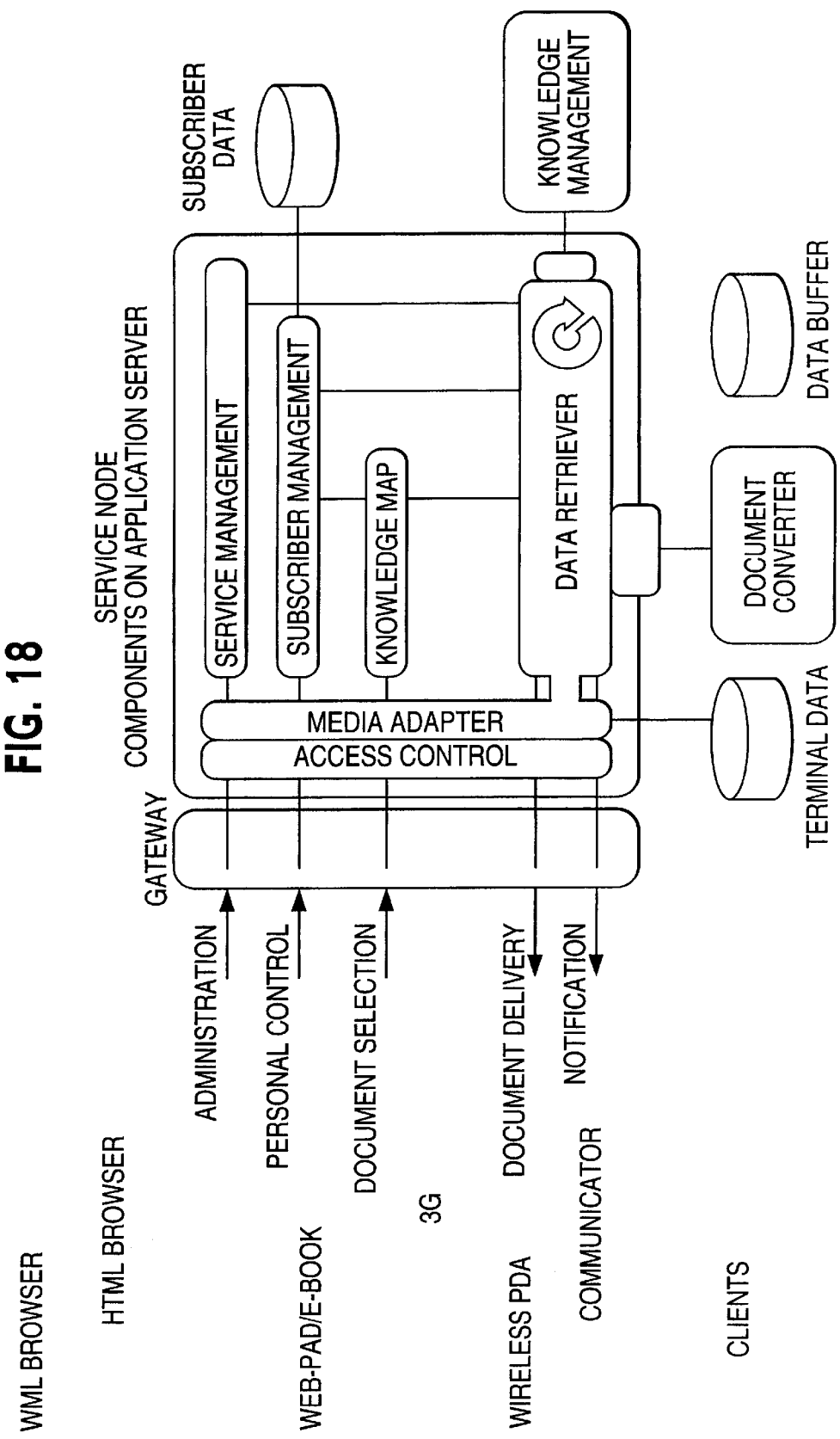
FIG. 18 illustrates the flow of data between clients and a service node in accordance with present invention.

FIG. 18 illustrates the flow of data between clients, that is, users, and a service node in accordance with the present invention. Various clients, that is, users or subscribers, etc., using various terminals, are interfaced with the service node having various components disposed on an application server, via a gateway. The service node on the application server includes service management, subscriber management, access control, a media adapter, a knowledgemap, and a data retriever. Subscriber data, terminal data, and a data buffer are external to the service node as it is a document converter and knowledge management.

While there have been illustrated and described what are considered to be preferred embodiments of the present invention, it will be understood by those skilled in the art that various changes and modifications may be made, and equivalents may be substituted for elements thereof without departing from the true scope of the present invention. Further, many modifications may be made to adapt a particular situation to the teachings of the present invention without departing from the central scope of the present invention. Therefore, it is intended that the present invention not be limited to the disclosed embodiment for carrying out the present invention, but that the present invention includes all embodiments falling within the scope of the appended claims.

What is claimed is:

1. An information management method comprising:
gathering and storing data from a plurality of data sources;
filtering and prioritizing the gathered and stored data;
packaging the filtered and prioritized data; and
delivering the packaged data to an end user;
wherein data is filtered and prioritized in a plurality of layers arranged sequentially, a first layer having a broadest categorization of data and each subsequent lower layer having a narrower categorization of data than its adjacent higher layer.

2. The method of claim 1, wherein the plurality of data sources comprise external sources of data and internal sources of data.

3. The method of claim 2, wherein the external sources of data comprise sources of data accessible on the Internet.

4. The method of claim 2, wherein the internal sources of data comprise sources of data accessible on a corporate Intranet.

5. The method of claim 2, wherein the internal sources of data comprise at least one of stored documents, stored databases and personal computers.

6. The method of claim 1, wherein when the data is prioritized as a "high" priority, then the data is immediately delivered to the end user while if the data is prioritized as a "low" priority, a signal is sent to the end user and the data is delivered upon a request by the end user.

7. The method of claim 1, wherein the plurality of layers comprises the first layer comprising a corporate layer, a second layer comprising a department layer, a third layer comprising a group layer and a fourth layer comprising a personal layer; and
wherein the personal layer corresponds to the interests of the end user, the group layer corresponds to the interests of a plurality of end users including the end user, the department layer corresponds to the interests of a plurality of groups including the plurality of end users and the corporate layer corresponds to the interests of a plurality of departments.

8. An information management apparatus comprising:
a means for gathering and storing data from a plurality of data sources;
a means for filtering and prioritizing the gathered and stored data;

a means for packaging the filtered and prioritized data; and a means for delivering the packaged data to an end user;

wherein data is filtered and prioritized by said means for filtering and prioritizing in a plurality of layers arranged sequentially, a first layer having a broadest categorization of data and each subsequent lower layer having a narrower categorization of data than its adjacent higher layer.

9. The apparatus of claim 8, wherein the plurality of sources of data comprise external sources of data and internal sources of data.

10. The apparatus of claim 9, wherein the external sources of data comprise sources of data accessible on the Internet.

11. The apparatus of claim 9, wherein the internal sources of data comprise sources of data accessible on a corporate Intranet.

12. The apparatus of claim 9, wherein the internal sources of data comprise at least one of stored documents, stored databases and personal computers.

13. The apparatus of claim 8, wherein when the data is prioritized as a "high" priority by the means for filtering and prioritizing, then the data is immediately delivered to the end user by the means for delivering while if the data is prioritized as a "low" priority by the means for filtering and prioritizing, a signal is sent to the end user and the data is delivered upon a request by the end user by the means for delivering.

14. The apparatus of claim 8, wherein the plurality of layers comprises: the first layer comprising a corporate layer, a second layer comprising a department layer, a third layer comprising a group layer and a fourth layer comprising a personal layer; and wherein the personal layer corresponds to the interests of the end user, the group layer corresponds to the interests of a plurality of end users including the end user, the department layer corresponds to the interests of a plurality of groups including the plurality of end users and the corporate layer corresponds to the interests of a plurality of departments.

15. A computer program of instructions, executable by a machine and embodied in a tangible medium, performing method steps comprising:

gathering and storing data from a plurality of data sources;

filtering and prioritizing the gathered and stored data;

packaging the filtered and prioritized data; and delivering the packaged data to an end user;

wherein data is filtered and prioritized in a plurality of layers arranged sequentially, a first layer having a broadest categorization of data and each subsequent lower layer having a narrower categorization of data than its adjacent higher layer.

16. The program of claim 15, wherein the plurality of data sources comprise external sources of data and internal sources of data.

17. The program of claim 16, wherein the external sources of data comprise sources of data accessible on the Internet.

18. The program of claim 16, wherein the internal sources of data comprise sources of data accessible on a corporate Intranet.

19. The program of claim 16, wherein the internal sources of data comprise at least one of stored documents, stored databases and personal computers.

20. The program of claim 15, wherein when the data is prioritized as a "high" priority, then the data is immediately delivered to the end user while if the data is prioritized as a "low" priority, a signal is sent to the end user and the data is delivered upon a request by the end user.

21. The program of claim 15, wherein the plurality of layers comprises the first layer comprising a corporate layer, a second layer comprising a department layer, a third layer comprising a group layer and a fourth layer comprising a personal layer; and wherein the personal layer corresponds to the interests of the end user, the group layer corresponds to the interests of a plurality of end users including the end user, the department layer corresponds to the interests of a plurality of groups including the plurality of end users and the corporate layer corresponds to the interests of a plurality of departments.

22. The method of claim 1, wherein the gathered and stored data is filtered based on stored personalized information of the end user.

23. The method of claim 1, wherein the data is pushed to the end user if it has been prioritized as a "high" priority.

24. The apparatus of claim 8, further comprising a means for filtering the gathered and stored data based on stored personalized information of the end user.

25. The apparatus of claim 8, further comprising a means for pushing the data to the end user if it has been prioritized as a "high" priority.

26. The program of claim 16, wherein the gathered and stored data is filtered based on stored personalized information of the end user.

27. The program of claim 16, wherein the data is pushed to the end user if it has been prioritized as a "high" priority.

* * * * *